(12) United States Patent
Hershko et al.

(10) Patent No.: US 9,081,907 B2
(45) Date of Patent: Jul. 14, 2015

(54) OPERATING M-PHY BASED COMMUNICATIONS OVER PERIPHERAL COMPONENT INTERCONNECT (PCI)-BASED INTERFACES, AND RELATED CABLES, CONNECTORS, SYSTEMS AND METHODS

(71) Applicant: QUALCOMM Incorporated, San Diego, CA (US)

(72) Inventors: Yuval Corey Hershko, Haifa (IL); Yoram Rimoni, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 13/662,999

(22) Filed: Oct. 29, 2012

(65) Prior Publication Data
US 2014/0122767 A1    May 1, 2014

(51) Int. Cl.
*G06F 13/40* (2006.01)
*G06F 13/38* (2006.01)

(52) U.S. Cl.
CPC ............ *G06F 13/387* (2013.01); *G06F 13/405* (2013.01)

(58) Field of Classification Search
CPC ............................ G06F 13/387; G06F 13/405
USPC .......................................... 710/306, 313, 315
See application file for complete search history.

(56) References Cited

U.S. PATENT DOCUMENTS

| 5,968,156 | A | 10/1999 | Kim |
| 6,816,934 | B2 | 11/2004 | Riley et al. |
| 7,899,948 | B2 | 3/2011 | Olschner et al. |
| 2009/0006709 | A1* | 1/2009 | Zhao et al. ............... 710/315 |
| 2009/0052903 | A1 | 2/2009 | Mussatt et al. |
| 2010/0088454 | A1* | 4/2010 | Chang et al. ............ 710/313 |
| 2010/0329245 | A1 | 12/2010 | Bordogna et al. |
| 2012/0026342 | A1 | 2/2012 | Yu et al. |
| 2014/0070846 | A1* | 3/2014 | Zou et al. ................. 326/82 |

OTHER PUBLICATIONS

International Search Report and Written Opinion—PCT/US2013/067049—ISA/EPO—Mar. 6, 2014.
Shuler, Kurt, "Interchip Connectivity: HSIC, UniPro, HSI, C2C, LLI . . . oh my!" Arteris Connected Blog, Mar. 31, 2011, 2 pages.
"MIPI(TM) MPHY—An introduction", Cosmic Circuits, Design & Reuse, pp. 1-4; XP055165646; first published Mar. 3, 2011—see http://web.archive.org/web/201103031050527 http://www.design-reuse.com/articles/25764/mipi-m-phy-ip.html; Retrieved from the Internet: http://www.design-reuse.com/articles/25764/mipi-m-phy-ip.html [retrieved on Jan. 28, 2015].

* cited by examiner

*Primary Examiner* — Glenn A Auve
(74) *Attorney, Agent, or Firm* — Paul S. Holdaway

(57) ABSTRACT

Embodiments disclosed herein include operating the M-PHY communications over peripheral component interconnect (PCI)-based interfaces. Related cables, connectors, systems, and methods are also disclosed. In particular, embodiments disclosed herein take the M-PHY standard compliant signals and direct them through a PCI compliant connector (and optionally cable) so as to allow two M-PHY standard compliant devices having PCI connectors to communicate.

19 Claims, 12 Drawing Sheets

| PCIe PIN NAME | DESCRIPTION | M-PHY PIN NAME (IN "SYSTEM BOARD" OR "UPSTREAM SUBSYSTEM") | M-PHY PIN NAME (IN "ADD-IN CARD" OR "DOWNSTREAM SUBSYSTEM") |
|---|---|---|---|
| PETp | TRANSMITTER DIFFERENTIAL PAIR | TXDP | RXDP |
| PETn | | TXDN | RXDN |
| PERp | RECEIVER DIFFERENTIAL PAIR | RXDP | TXDP |
| PERn | | RXDN | TXDN |

FIG. 2

| PCIe Pin Num | CONNECTOR SIDE B | | M-PHY Usage (at "Upstream Subsystem") | PCIe Pin Name | CONNECTOR SIDE A | M-PHY Usage (at "Downstream Subsystem") |
|---|---|---|---|---|---|---|
| | PCIe Pin Name | PCIe Pin Description | | | PCIe Pin Description | |
| 1 | +12V | 12V power | | PRSNT1# | Hot-Plug presence detect | |
| 2 | +12V | 12V power | Optional | +12V | 12V power | Optional |
| 3 | +12V | 12V power | | +12V | 12V power | |
| 4 | GND | Ground | Ground | GND | Ground | Ground |
| 5 | SMCLK | SMBus clock | Optional | JTAG2 | TCK | Optional |
| 6 | SMDAT | SMBus data | | JTAG3 | TDI | |
| 7 | GND | Ground | Ground | JTAG4 | TDO | |
| 8 | +3.3V | 3.3V power | Optional | JTAG5 | TMS | |
| 9 | JTAG1 | TRST# | | +3.3V | 3.3V power | |
| 10 | 3.3Vaux | 3.3V auxiliary power | | +3.3V | 3.3V power | |
| 11 | Wake# | Signal for Link reactivation | | PRSNT1# | Fundamental reset | |
| Mechanical key | | | | | | |
| 12 | RSVD | Reserved | Reserved | GND | Ground | Ground |
| 13 | GND | Ground | Ground | REFCLK+ | Reference clock (differential clock) | Optional |
| 14 | PETp0 | Transmitter differential pair, Lane 0 | TXDP, Lane 0 | REFCLK- | | |
| 15 | PETn0 | | TXDN, Lane 0 | GND | Ground | Ground |
| 16 | GND | Ground | Ground | PERp0 | Receiver differential pair, Lane 0 | RXDP, Lane 0 |
| 17 | PRSNT2# | Hot-Plug presence detect | Optional | PERn0 | | RXDN, Lane 0 |
| 18 | GND | Ground | Ground | GND | Ground | Ground |

FIG. 5

OPERATING M-PHY BASED COMMUNICATIONS OVER PERIPHERAL COMPONENT INTERCONNECT (PCI)-BASED INTERFACES, AND RELATED CABLES, CONNECTORS, SYSTEMS AND METHODS

BACKGROUND

I. Field of the Disclosure

The technology of the present disclosure relates generally to communications interfaces used for communications between electronic devices.

II. Background

Electronic devices have proliferated throughout society supporting a wide range of applications and uses. As the number and variety of devices expand, there is an increasing need for electronic devices to communicate with one another. In response to this need, various protocols have been proposed and adopted. In many instances, the protocols define signal levels, and associated data representations and timing that are communicated between the electronic devices. Examples of these protocols include wireless communications, such as the 802.11 standards set forth by the Institute of Electrical and Electronics Engineers (IEEE) and BLUE-TOOTH®. Wireless signal protocols may also specify frequency and power levels. Others of these protocols are wire-based. In the event that a protocol is wire-based, a standardized physical connector may be required to effectuate communications between the devices. Various physical connectors, for example Registered Jack-11 (RJ-11), RJ-14, RJ-21, RJ-45, and RJ-49, have been used successfully for various purposes and protocols.

With the increase of mobile platform devices, and the increased functionality in each of these devices, data rates between peripherals have seen exponential growth. In this regard, the Mobile Industry Processor Interface (MIPI®) Alliance has recently proposed the M-PHY® physical layer standard defining a data rate of 10 Kbps to 5.8 Gbps per lane. The M-PHY standard is optimized for mobile applications, such as cameras, displays for mobile terminals, smart phones, and the like. However, while the M-PHY standard provides a serial interface technology with high bandwidth capabilities, the M-PHY specification deliberately avoids connector definitions and advocates for a permanent trace based connection between devices. Permanent trace based connections eliminate the flexibility of user desired connections.

SUMMARY OF THE DISCLOSURE

Embodiments disclosed herein include operating the M-PHY communications over peripheral component interconnect (PCI)-based interfaces. Related cables, connectors, systems, and methods are also disclosed. In particular, embodiments disclosed herein take the M-PHY standard compliant signals and direct them through a PCI-based compliant connector (and optionally cable) so as to allow two M-PHY standard compliant devices having PCI-based connectors to communicate.

In this regard, in one exemplary embodiment, an electronic device is configured to operate using the M-PHY standard. The electronic device comprises a communications interface having a plurality of data paths conforming to the M-PHY standard and a PCI-based connector having a plurality of pins. The plurality of pins of the PCI-based connector comprises a PETp pin electrically coupled to a M-PHY TXDP data path of the communications interface, a PETn pin electrically coupled to a M-PHY TXDN data path of the communications interface. The plurality of pins of the PCI-based connector also comprises a PERp pin electrically coupled to a M-PHY RXDP data path of the communications interface. The plurality of pins of the PCI-based connector also comprises a PERn pin electrically coupled to a M-PHY RXDN data path of the communications interface.

In another embodiment, an electronic device configured to operate using a M-PHY standard is provided. The electronic device comprises a means for interfacing the electronic device to another device, the interfacing means having a plurality of data paths conforming to the M-PHY standard. The electronic device also comprises a PCI-based connecting means for connecting the interfacing means to another device, the PCI-based connecting means having a plurality of pins. The plurality of pins of the PCI-based connecting means comprises a PETp pin electrically coupled to a M-PHY TXDP data path of the communications interface, a PETn pin electrically coupled to a M-PHY TXDN data path of the communications interface. The plurality of pins of the PCI-based connecting means also comprises a PERp pin electrically coupled to a M-PHY RXDP data path of the communications interface. The plurality of pins of the PCI-based connecting means also comprises a PERn pin electrically coupled to a M-PHY RXDN data path of the communications interface.

In another embodiment, a method of connecting an electronic device configured to operate using the M-PHY standard to a second device, is provided. The method comprises providing a plurality of data paths conforming to the M-PHY standard and providing a PCI-based connector having a plurality of pins. The method also comprises electrically coupling a PETp pin to a M-PHY TXDP data path and electrically coupling a PETn pin to a M-PHY TXDN data path. The method also comprises electrically coupling a PERp pin to a M-PHY RXDP data path and electrically coupling a PERn pin to a M-PHY RXDN data path.

In another embodiment, an electronic device configured to operate using a M-PHY standard is provided. The device comprises a communications interface having a plurality of data paths conforming to the M-PHY standard. The electronic device also comprises a PCI-based connector having at least four pins. The PCI-based connector comprises a first two pins configured to couple electrically to a M-PHY transmission data path of the communications interface and a second two pins configured to couple electrically to a M-PHY receive data path of the communications interface.

BRIEF DESCRIPTION OF THE FIGURES

FIG. 2 is a table illustrating an exemplary mapping of PCI pins of a PCI connector to a M-PHY data path for a M-PHY standard;

FIG. 5 illustrates an exemplary embodiment of a particular configuration of a mapping of PCI pins of a PCI connector to M-PHY standard signals;

DETAILED DESCRIPTION

Figure 1A:
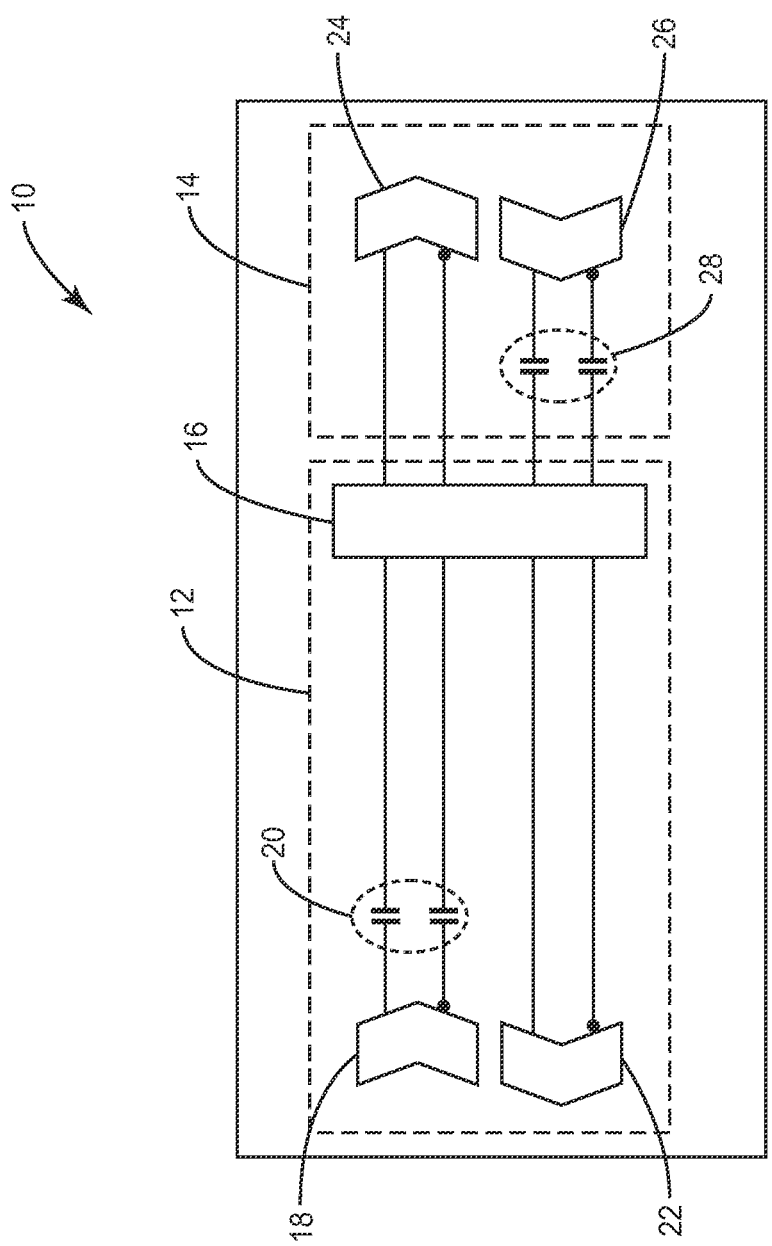
FIG. 1A is a block diagram of an exemplary conventional direct mated Peripheral Component Interconnect (PCI) connection between a host and other device.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed herein include operating the M-PHY communications over Peripheral Component Interconnect (PCI)-based interfaces. Related cables, connectors, systems, and methods are also disclosed. In particular, embodiments disclosed herein take the M-PHY standard compliant signals and direct them through a PCI-based compliant connector (and optionally cable) so as to allow two M-PHY standard compliant devices having PCI-based connectors to communicate.

The Mobile Industry Processor Interface (MIPI®) Alliance has proposed the M-PHY standard, which is a physical layer protocol detailing how devices communicate with one another. However, the MIPI® Alliance has to date, not defined or constrained the M-PHY standard to a particular connector type that complies with the standard, leaving the design of the physical connectors to the entities deploying products in this space. While it is possible to design such a physical connector without reference to any existing connector type, an existing connector is adapted herein to satisfy the signal integrity and other requirements of the MIPI® Alliance M-PHY standard, namely the PCI-based connector currently used for PCI-based protocol compliant devices. As a non-limiting example, the PCI-based connector that is adapted to be used for the MIPI® Alliance M-PHY standard can be a PCI express (PCIe) connector.

PCI is an industry standard introduced in the early 1990s by Intel's Architecture Development Lab. PCI 3.0 was subsequently introduced in 2002. PCIe was designed to replace the older PCI-based standards. Initially introduced in 2003, various iterations of the standard have been published with PCIe 3.0 made available in November 2010. On Nov. 29, 2011, PCIe 4.0 was announced with an expected release date in 2014 or 2015. The PCIe standard defines PHYs with transmission speeds of 2.5 Gbit/s for PCIe v1.x, 5.0 Gbit/s for PCIe v2.x, and up to 8.0 Gbit/s for PCIe v3.0. More information on the conventional PCI 3.0 standard and connectors can be found at www.pcisig.com/specifications/ and particularly at www.pcisig.com/specifications/pciexpress/, the contents of which are hereby incorporated herein by reference in their entireties. Before discussing the embodiments of adapting the PCI connector to the M-PHY standard, PCI connectors are first discussed with regard to FIGS. 1A-1E.

In this regard, FIG. 1A is an exemplary block diagram of a conventional PCI connection 10. In this exemplary embodiment, the PCI connection 10 is PCIe 3.0 compliant and includes a system board (sometimes referred to herein as an upstream subsystem) 12 and an add-in card (sometimes referred to as a downstream subsystem) 14. The add-in card 14 is directly plugged into the system board 12 through a mated connector 16. The system board 12 includes a transmitter 18, filtering capacitors 20, and a receiver 22. The add-in card 14 similarly has a receiver 24, a transmitter 26, and filtering capacitors 28. Following the published PCI protocol, the system board transmitter sends PETp and PETn signals to the add-in card 14, which treats the incoming signals as PERp and PERn signals respectively. Similarly, the add-in card transmitter 18 sends PETp and PETn signals to the system board 12, which treats the incoming signals as PERp and PERn signals respectively. A non-limiting example of this arrangement might be a video card (add-in card 14) inserted into a PCI port on a computer mother board (system board 12).

Figure 1B:
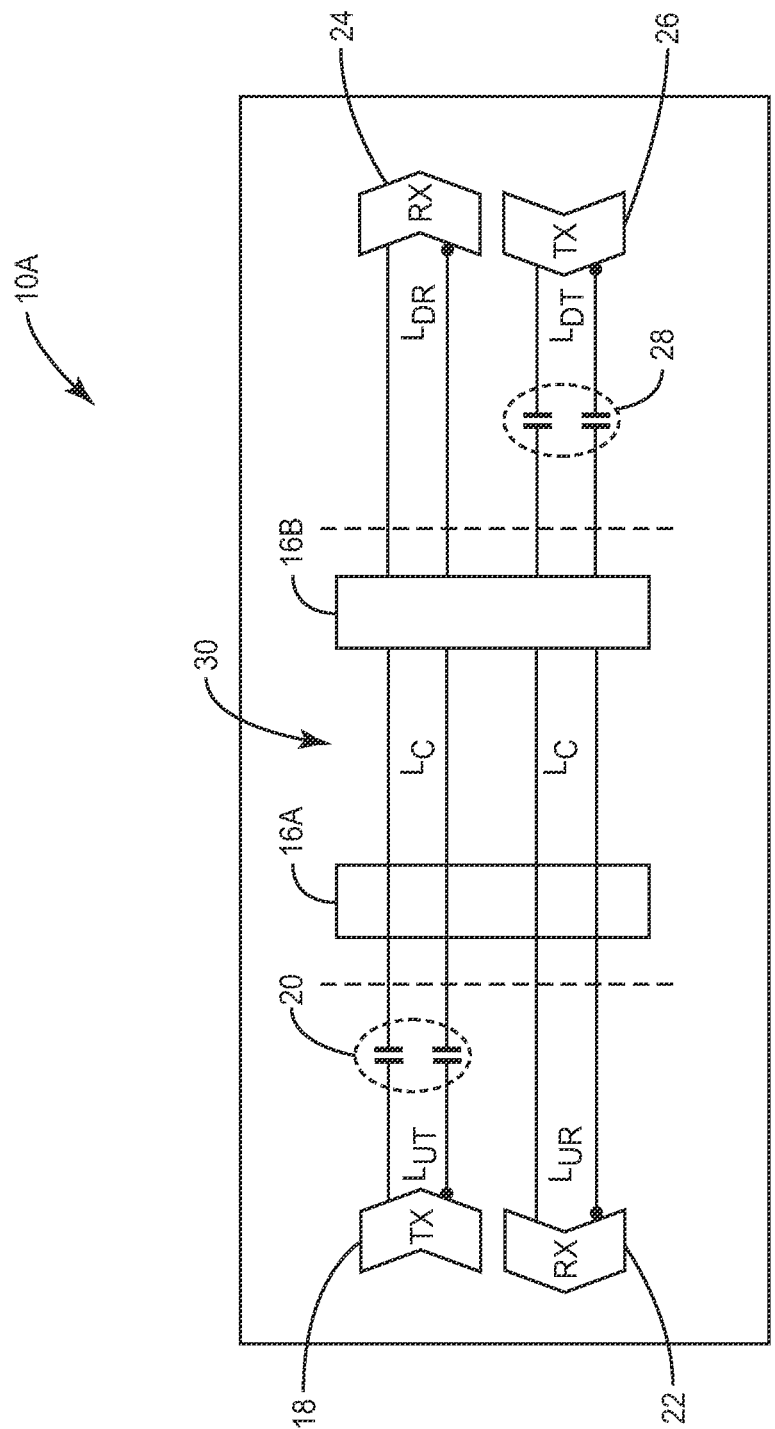
FIG. 1B is a block diagram of an exemplary conventional cable mated PCI connection between a host and other device.

FIG. 1B illustrates a PCI connection 10A similar to the PCI connection 10 in FIG. 1A. However, instead of the mated connector 16, the system board 12 may include a connector 16A, and the add-in card 14 includes a connector 16B with a cable 30 extending therebetween. It should be appreciated that connector 16A may be a mated connection, with a connector on the system board 12 and a connector on the cable 30 and the connector 16B may similarly be a mated connection, with a connector on the add-in card 14 and a connector on the cable 30. A non-limiting example of this arrangement might be a hard drive (downstream subsystem 14) being plugged into a computer mother board (system board 12) through a PCI cable (cable 30). While not illustrated, another possibility does exist. That other possibility is a cable with a connector at one end and "hard wired" to the device at the other end.

Figure 1C:
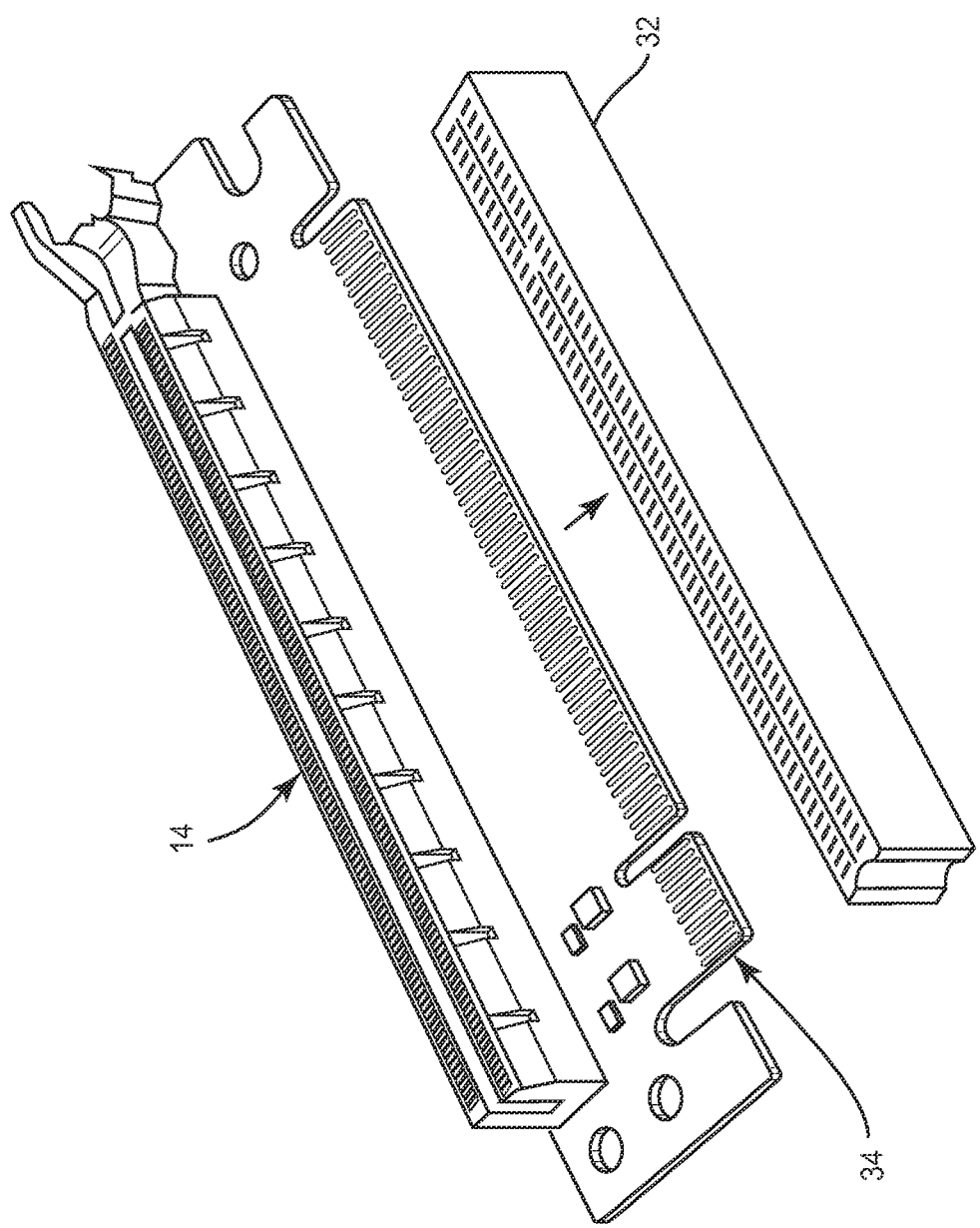
FIG. 1C is a perspective view of a conventional PCI socket and card.

FIG. 1C is a perspective view of an exemplary conventional mating socket 32 and add-in card 14 with plug 34 that are compliant with PCI 3.0. In particular, the socket 32 includes up to eighty-two (82) conductive elements, each of which has a purpose defined by the PCI standard and which mate with corresponding conductive elements on the add-in card 14. When the add-in card 14 is inserted into the socket 32, the mated connector 16 of FIG. 1A is formed. As defined by the PCI standard, the names and uses of the pins are summarized in TABLE 1 set forth below.

TABLE 1

Conventional PCI Standard-A Connector Pin Assignment and Mating Sequence

| Pin | Side B | Side A | Comments |
|---|---|---|---|
| 1 | +12 V | PRSNT1# | Pulled low to indicate card inserted |
| 2 | +12 V | +12 V | |
| 3 | +12 V | +12 V | |
| 4 | Ground | Ground | |
| 5 | SMCLK | TCK | SMBus and JTAG port pins |
| 6 | SMDAT | TDI | |
| 7 | Ground | TDO | |
| 8 | +3.3 V | TMS | |
| 9 | TRST# | +3.3 V | |
| 10 | +3.3 V aux | +3.3 V | Standby power |
| 11 | Wake# | PWRGD | Link reactivation, power good |
| Key Notch | | | |
| 12 | Reserved | Ground | |
| 13 | Ground | REFCLK+ | Reference clock differential pair |
| 14 | HSOp(0) | REFCLK− | Lane 0 transmit data + and − |

TABLE 1-continued

Conventional PCI Standard-A Connector Pin Assignment and Mating Sequence

| Pin | Side B | Side A | Comments |
|---|---|---|---|
| 15 | HSOn(0) | Ground | |
| 16 | Ground | HSlp(0) | Lane 0 receive data + and − |
| 17 | PRSNT2# | HSln(0) | |
| 18 | Ground | Ground | |
| | | End x1 connector | |
| 19 | HSOp(1) | Reserved | Lane 1 transmit data + and − |
| 20 | HSOn(1) | Ground | |
| 21 | Ground | HSlp(1) | Lane 1 receive data + and − |
| 22 | Ground | HSln(1) | |
| 23 | HSOp(2) | Ground | Lane 2 transmit data + and − |
| 24 | HSOn(2) | Ground | |
| 25 | Ground | HSlp(2) | Lane 2 receive data + and − |
| 26 | Ground | HSln(2) | |
| 27 | HSOp(3) | Ground | Lane 3 transmit data + and − |
| 28 | HSOn(3) | Ground | |
| 29 | Ground | HSlp(3) | Lane 3 receive data + and − |
| 30 | Reserved | HSln(3) | |
| 31 | PRSNT2# | Ground | |
| 32 | Ground | Reserved | |
| | | End x4 connector | |
| 33 | HSOp(4) | Reserved | Lane 4 transmit data + and − |
| 34 | HSOn(4) | Ground | |
| 35 | Ground | HSlp(4) | Lane 4 receive data + and − |
| 36 | Ground | HSln(4) | |
| 37 | HSOp(5) | Ground | Lane 5 transmit data + and − |
| 38 | HSOn(5) | Ground | |
| 39 | Ground | HSlp(5) | Lane 5 receive data + and − |
| 40 | Ground | HSln(5) | |
| 41 | HSOp(6) | Ground | Lane 6 transmit data + and − |
| 42 | HSOn(6) | Ground | |
| 43 | Ground | HSlp(6) | Lane 6 receive data + and − |
| 44 | Ground | HSln(6) | |
| 45 | HSOp(7) | Ground | Lane 7 transmit data + and − |
| 46 | HSOn(7) | Ground | |
| 47 | Ground | HSlp(7) | Lane 7 receive data + and − |
| 48 | PRSNT2# | HSln(7) | |
| 49 | Ground | Ground | |
| | | End x8 connector | |
| 50 | HSOp(8) | Reserved | Lane 8 transmit data + and − |
| 51 | HSOn(8) | Ground | |
| 52 | Ground | HSlp(8) | Lane 8 receive data + and − |
| 53 | Ground | HSln(8) | |
| 54 | HSOp(9) | Ground | Lane 9 transmit data + and − |
| 55 | HSOn(9) | Ground | |
| 56 | Ground | HSlp(9) | Lane 9 receive data + and − |
| 57 | Ground | HSln(9) | |
| 58 | HSOp(10) | Ground | Lane 10 transmit data + and − |
| 59 | HSOn(10) | Ground | |
| 60 | Ground | HSlp(10) | Lane 10 receive data + and − |
| 61 | Ground | HSln(10) | |
| 62 | HSOp(11) | Ground | Lane 11 transmit data + and − |
| 63 | HSOn(11) | Ground | |
| 64 | Ground | HSlp(11) | Lane 11 receive data + and − |
| 65 | Ground | HSln(11) | |
| 66 | HSOp(12) | Ground | Lane 12 transmit data + and − |
| 67 | HSOn(12) | Ground | |
| 68 | Ground | HSlp(12) | Lane 12 receive data + and − |
| 69 | Ground | HSln(12) | |
| 70 | HSOp(13) | Ground | Lane 13 transmit data + and − |
| 71 | HSOn(13) | Ground | |
| 72 | Ground | HSlp(13) | Lane 13 receive data + and − |
| 73 | Ground | HSln(13) | |
| 74 | HSOp(14) | Ground | Lane 14 transmit data + and − |
| 75 | HSOn(14) | Ground | |
| 76 | Ground | HSlp(14) | Lane 14 receive data + and − |
| 77 | Ground | HSln(14) | |
| 78 | HSOp(15) | Ground | Lane 15 transmit data + and − |
| 79 | HSOn(15) | Ground | |
| 80 | Ground | HSlp(15) | Lane 15 receive data + and − |
| 81 | PRSNT2# | HSln(15) | |
| 82 | Reserved | Ground | |

Figure 1D:
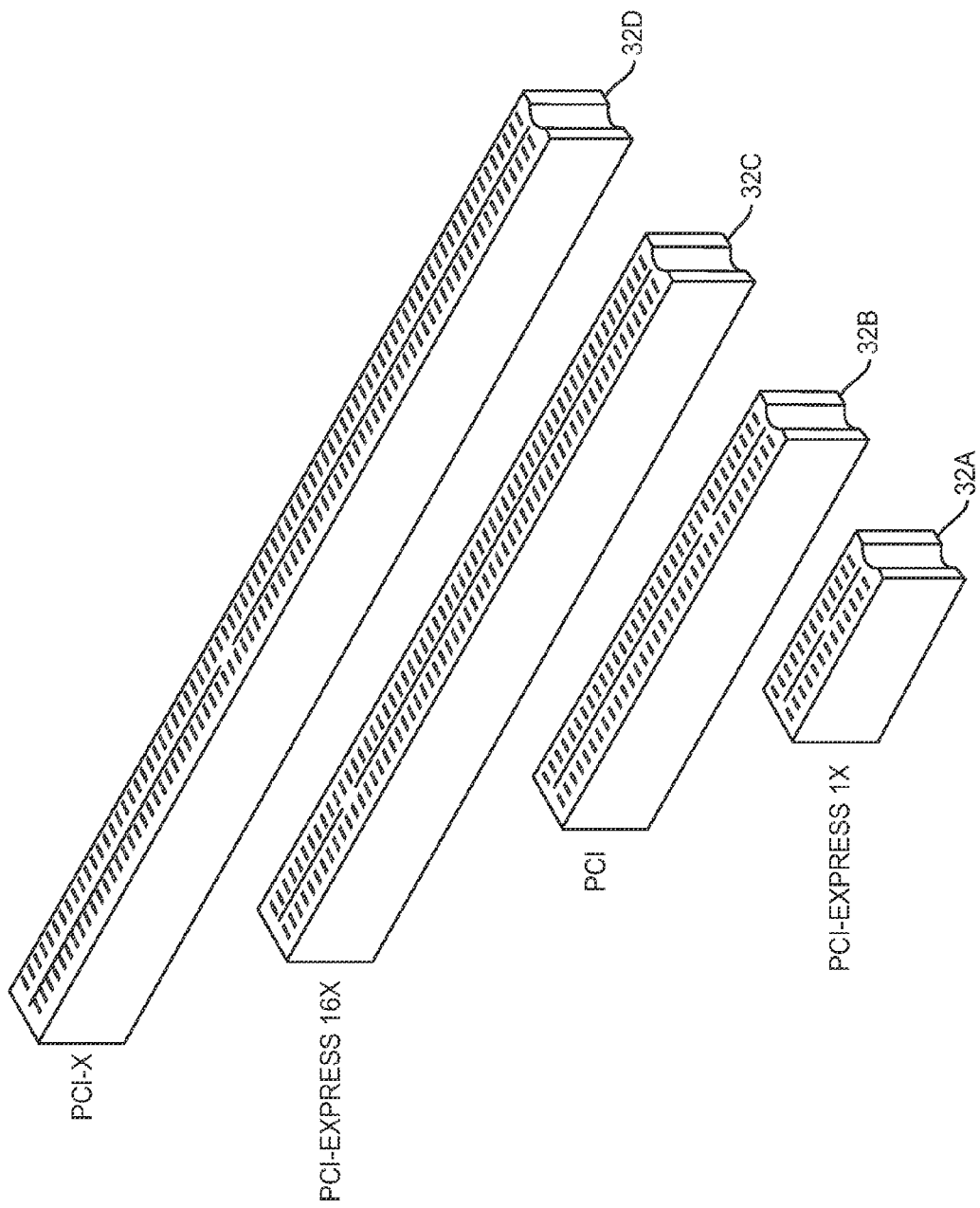
FIG. 1D is a perspective view of a variety of conventional PCI sockets.

Because the PCI standard is several years old, the industry has had time to develop a standardized plug 34 and connector or socket 32, which are illustrated in FIG. 1C. There are numerous manufacturers capable of manufacturing PCI compliant connectors according to the well-established form factor. Likewise, stress and bend tolerances and other fatigue related tolerances and the like are well understood by those who use such connectors. Many specific definitions and requirements are set forth in the PCI specification, and the industry has acclimated to meeting these definitions and requirements. While the present disclosure focuses on PCIe, it should be appreciated that the concepts of the present disclosure may be adapted to conform to other PCI standards without departing from the inventive concepts of the present disclosure. Likewise, even within PCIe, different versions of PCIe (e.g., PCIe 1x, PCIe 4x, PCIe 8x, and PCIe 16x are all supported). For example, as illustrated in FIG. 1D, a variety of sockets 32A-32D are illustrated as being adapted for use with the present disclosure. Socket 32A is a PCIe 1x socket; socket 32B is a PCI 3.0 socket; socket 32C is a PCIe 16x socket; and socket 32D is a PCI-x socket.

Figure 1E:
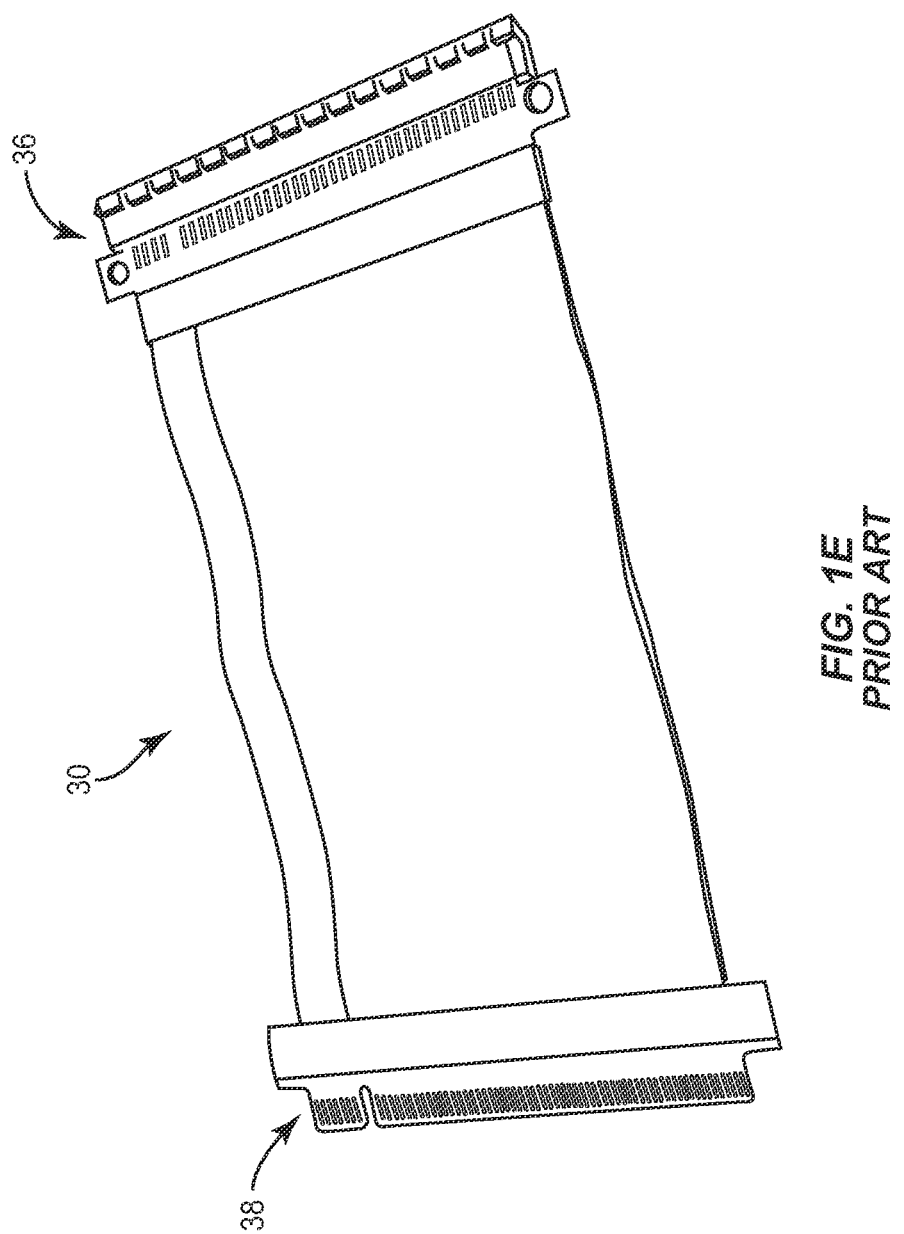
FIG. 1E is a top plan view of a conventional PCI ribbon cable.

FIG. 1E illustrates a conventional PCIe ribbon cable 30 that includes a socket end 36 and a plug end 38, which when mated with corresponding plugs and sockets results in mated connections 16A and 16B.

The present disclosure takes advantage of the familiarity with which industry treats the PCI-based connectors and particularly with sockets 32 (and corresponding plugs) and proposes repurposing such connectors for use with M-PHY standard compliant devices. In particular, use of the existing PCI-based connector in an M-PHY standard compliant device allows all the expertise and familiarity the industry has with the PCI connector to be leveraged into ready acceptance of its use with M-PHY standard compliant devices. The well-developed manufacturing base allows for ease in securing the connectors for incorporation into M-PHY standard compliant devices. That is, there will be little or no delay in securing an acceptable manufacturer of connectors for ready inclusion in M-PHY standard compliant devices and the competition between existing manufacturers means that the cost of the individual connectors will likely be reasonable. Similarly, because PCI-based connectors (in their various permutations) are currently made in high volumes, there may be reductions in cost because of appropriate economies of scale.

With reference to FIG. 2, the chart 40 illustrates the mapping of the M-PHY standard compliant pin names to the corresponding PCI 3.0 signal. In particular, FIG. 2 illustrates in the column labeled PCIe PIN name, that pins PETp, PETn, PERp, and PERn are repurposed from their respective PCI signal use to a corresponding M-PHY signal use. Thus, in embodiments of the present disclosure, the PETp pin, which was used as part of the transmitter differential pair is used for the TXDP signal; the PETn pin is used for the TXDN signal; the PERp pin is used for the RXDP signal; and the PERn pin is used for the RXDN signal. In both the PCI standard and the usage proposed herein, the pins are used for a receiver differential pair and transmitter differential pair as noted. While the mapping of FIG. 2 only discusses a single TX lane and a single RX lane, multiple lanes can be used by replicating the configuration up to the number of differential transmission pairs present in the PCIe connector.

Figure 3:
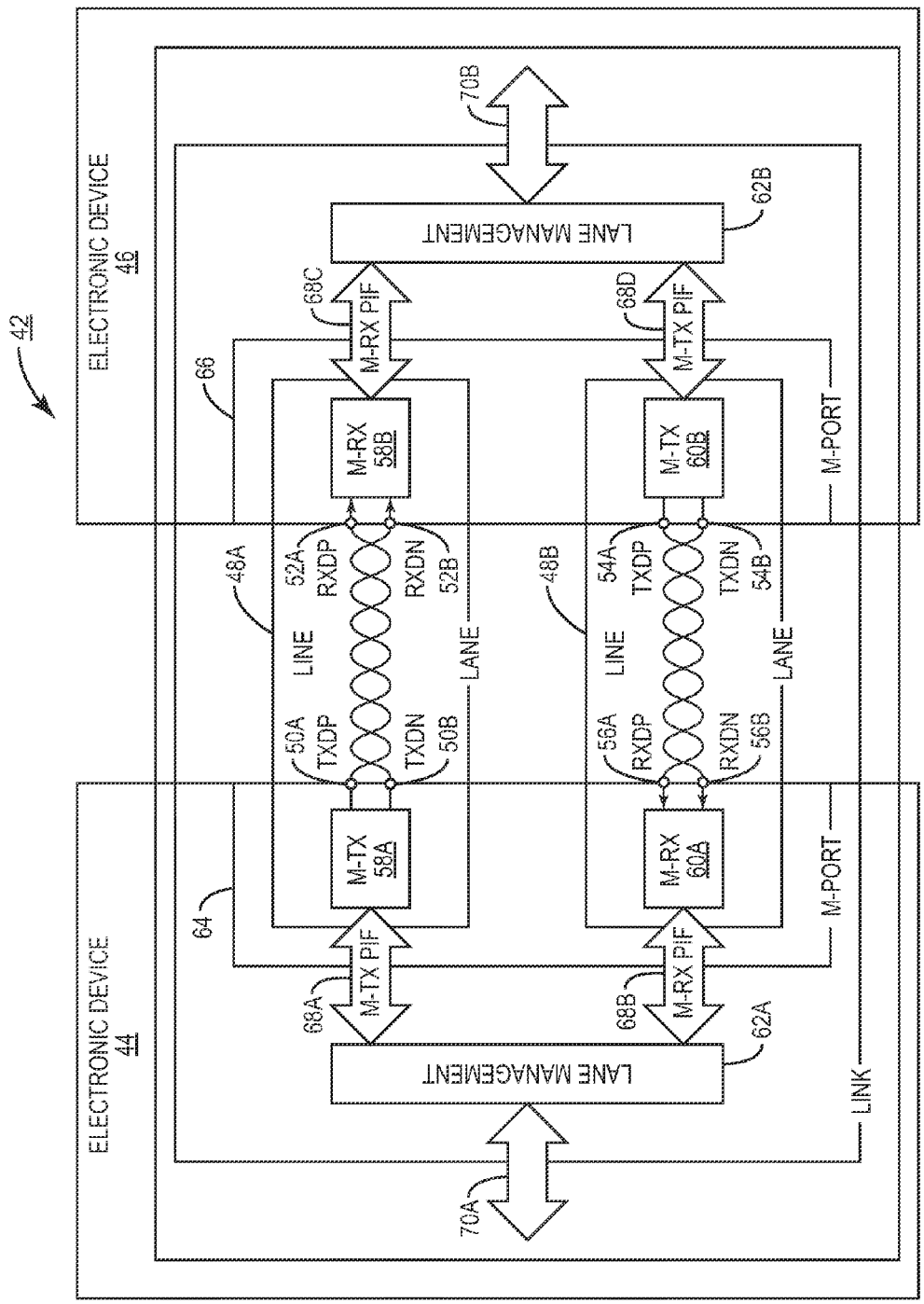
FIG. 3 is a block diagram of a conventional M-PHY single lane signal path layout for connection of M-PHY standard compliant electronic devices.

An exemplary conventional M-PHY signal path layout 42 with pin requirements is provided with reference to FIG. 3. That is, a first electronic device 44 is connected to a second electronic device 46. The first electronic device 44 can include a control system or processor (discussed below in regard to FIG. 8), which may, through appropriate device drivers, control the signal lanes 48A, 48B of a communications interface (sometimes referred to herein as a means for interfacing) according to the M-PHY standard. The signal lane 48A is the lane through which the first electronic device 44 transmits data to the second electronic device 46 through the TXDP and TXDN pins 50A, 50B to RXDP and RXDN pins 52A, 52B. Likewise, the second electronic device 46 transmits data to the first electronic device 44 through the TXDP and TXDN pins 54A, 54B to RXDP and RXDN pins 56A, 56B. Each electronic device 44, 46 has its own respective transmitter M-TX 58A, 60B and receiver M-RX 60A, 58B controlled by respective lane management module 62A, 62B. The lane management modules 62A, 62B may be hardware or software or a mix of the two as desired and may communicate with the control system via links 70A, 70B. The pins 50A, 50B, 56A, 56B may be in a single M-Port 64, and the pins 52A, 52B, 54A, 54B by virtue of their presence on a second, different device are defined to be in a second M-Port 66.

With continuing reference to FIG. 3, the lane management module 62A may communicate with the transmitter 58A through a peripheral interchange format (PIF) link 68A and with the receiver 60A through a PIF link 68B. Likewise, the lane management module 62B may communicate with the receiver 58B through a PIF link 68C and the transmitter 60B through a PIF link 68D. The lane management modules 62A, 62B, the links 70A, 70B, the transmitters 58A, 60B, receivers 58B, 60A, and PIF links 68A-68D are set forth in the M-PHY standard, and the interested reader is directed thereto for more information regarding these elements. As illustrated, the first electronic device 44 is directly connected to the second electronic device 46. While not explicitly illustrated, it should be appreciated that the direct connection could be replaced by a connector, cable, or combination. Again, the signals and lane management elements are defined by the M-PHY standard, but the arrangement of the pins and any connectors is left undefined. However, as noted with reference to FIG. 2, a PCI-based connector or socket 32 may be repurposed by mapping the PETp, PETn, PERp, and PERn pins to the TXDP, TXDN, RXDP, and RXDN signals respectively without requiring any physical changes to the connector or socket 32. In this regard, the connector or socket 32 may sometimes be referred to herein as a means for connecting.

Figure 4:
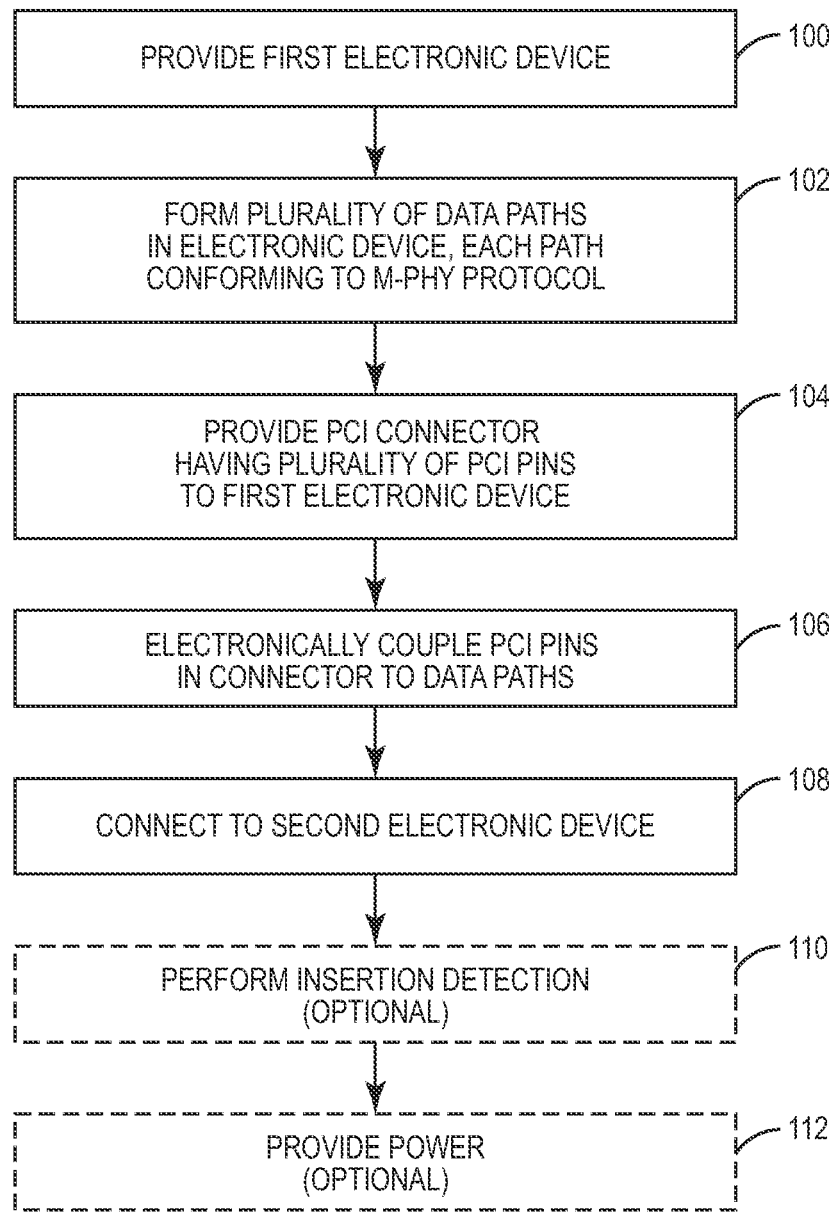
FIG. 4 is a flowchart illustrating an exemplary process for mapping PCI pins of a PCI connector to M-PHY standard data paths.

Turning to FIG. 4, a flow chart is provided illustrating a method of connecting a first electronic device (such as electronic device 44 in FIG. 4), configured to operating using a M-PHY standard to a second electronic device (such as electronic device 46 in FIG. 4), through a mated connection, a cable with mated connectors or the like. Initially, the method provides an electronic device (block 100) and forms a plurality of data paths in the electronic device, wherein each path conforms to M-PHY standard (block 102). The method provides a PCI-based connector (e.g., a plug or a socket) having a plurality of pins to the electronic device (block 104). In an exemplary embodiment, the PCI-based connector is a PCI plug that conforms to the PCIe 3.0 described above, with reference to FIG. 1C and TABLE 1. In alternate embodiments, other PCI standards may be used without departing from the teachings of the present disclosure.

With continuing reference to FIG. 4, the method also provides that the pins in the connector are electrically coupled to the data paths (block 106). In an exemplary embodiment, the pins are mapped by electrically coupling a first transmit pin (e.g., the PETp) to a M-PHY TXDP data path, electrically coupling a second transmit pin (e.g., the PETn) to a M-PHY TXDN data path, electrically coupling a first receive pin (e.g., the PERp) to a M-PHY RXDP data path, and electrically coupling a second receive pin (e.g., PERn) to a M-PHY RXDN data path.

With continuing reference to FIG. 4, and with the data paths connected to the respective pins in the connector 32, the electronic device may be connected to a second electronic device (e.g., second device 46) (block 108). During connection or shortly thereafter, the control system associated with the connector may perform insertion detection (block 110) and/or provide power (block 112) to the second electronic device 46.

Figure 6:
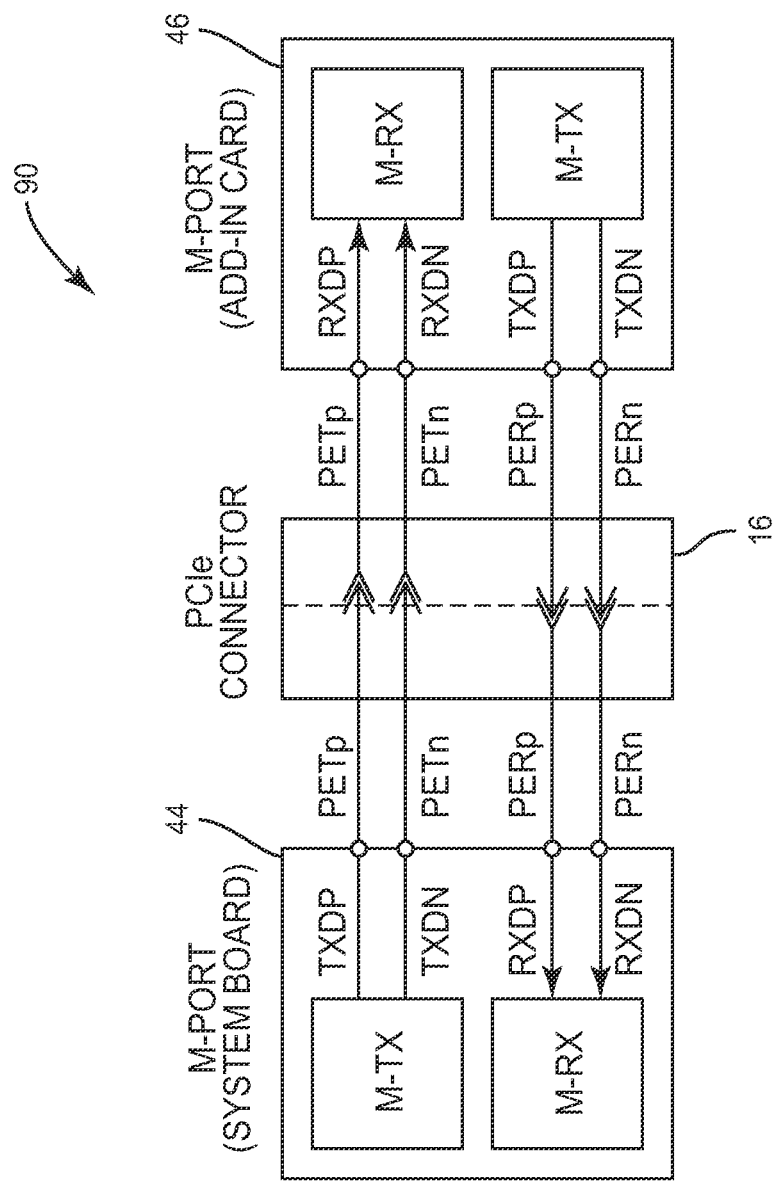
FIG. 6 is a block diagram of an exemplary Peripheral Component Interconnect Express (PCIe) direct connection repurposed for using M-PHY standard signals.
Figure 7:
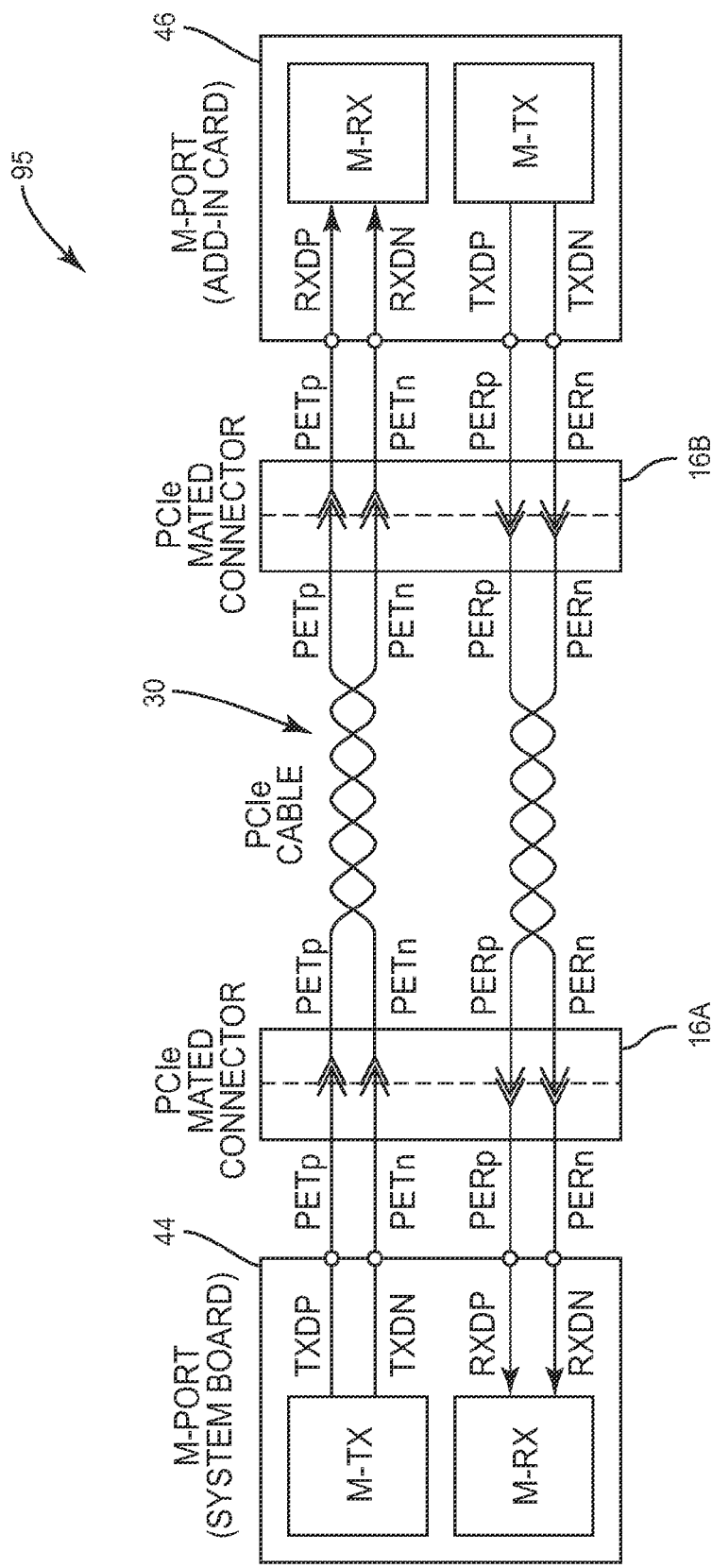
FIG. 7 is a block diagram of a PCIe cabled connection repurposed for using M-PHY standard signals.

Using the PCI connector plug or socket 32 allows for insertion detection and provides the ability to supply power to the second electronic device 46. Insertion detection allows the first electronic device 44 to know when it is acceptable to send data or listen for data from the second electronic device 46. Likewise, the second electronic device 46 should detect that the first electronic device 44 has been connected. Other advantages may also be realized through insertion detection, and the present disclosure is not so limited. Likewise, providing power to the second electronic device 46 allows the designers to avoid having to provide a power cord or alternate power source for the second electronic device. There are a number of possible configurations which would allow this to happen. Three exemplary configurations using PCI connectors (plugs, receptacles and/or cables) are illustrated in FIGS. 5-7.

In this regard, with reference to FIG. 5, the first electronic device 44 is considered the system board or upstream subsystem and the second electronic device 46 is considered the add-in card or downstream subsystem. Note that while PCI defines a system board and an add-in card (referred to herein sometimes as the upstream subsystem and the downstream subsystem), M-PHY does not make this distinction, although the distinction is preserved in the present disclosure to facilitate the explanation. In the upstream subsystem 44, pins 1-3, which in the PCIe 3.0 standard are designated to provide a twelve (12) volt power signal, may optionally provide the same function if needed. Pin 4 continues to provide a ground signal. Pins 5 and 6 are optional, but can provide a clock signal as set forth in the PCIe standard. Pin 7 provides a ground signal. Pins 8-11 may optionally continue to provide auxiliary power as well as a wake signal. Pin 12 remains reserved. Pin 13 remains a ground signal. Pins 14 and 15 are repurposed from being the PETp0 and PETn0 to the TXDP, lane 0, and TXDN lane 0, respectively. Thus, pins 14 and 15 remain used for the transmitter differential pair, lane 0. Pins 16 and 18 remain connected to ground and pin 17 is an optional pin. Thus, pins 14 and 15 are used for the data lanes of the M-PHY standard.

With continuing reference to FIG. 5, in the downstream subsystem 46, pins 1-3 are optional. Pin 4 remains a ground (GND) pin. Pins 5-11 are optional and may be used according to the PCIe standard or other purpose as desired. Pin 12 remains a ground pin. Pins 13 and 14 are optional. Pin 15 remains a ground (GND) pin. Pins 16 and 17 are repurposed to carry the RXDP and RXDN signals respectively. Pin 18 remains a ground pin. Because the PCIe standard has built in pins for power provision and insertion detection, these functions may be reused if desired.

With this arrangement, power may be provided in various levels. Specifically, 12V power may be provided using pins 1, 2, and 3 on side B and pins 2 and 3 on side A. Likewise, 3.3V power may be provided using pin 8 on side B and pins 9 and 10 on side A. 3.3V power may be provided using pin 10 on side B. Likewise, insertion can be supported using pin 1 on side A and pins 17, 31, 48, and 81 on side B (see TABLE 2 below). A shared clock may be made available, supporting M-PHY Type II. The shared clock could be provided using one or both of pins 13 and 14 on side A.

FIG. 5 illustrates an x1 connector 80 under the PCIe standard. The x1 appellation refers to a length of the connector and how many data lanes it supports (i.e., lane 0 equals 1 lane). TABLE 2, set forth below, provides a full set of pin reassignments through an x16 connector (x8 supports 8 data lanes 0-7 and x16 supports 16 data lanes 0-15 as set forth in full detail below).

TABLE 2

Exemplary PCIe-M-PHY Mapping for Various Sized Connectors

| | Connector Side B - Upstream subsystem | | | Connector Side A - downstream subsystem | | |
|---|---|---|---|---|---|---|
| PCIe Pin Num | PCIe Pin Name | PCIe Pin Description | M-PHY Usage (at "System Board") | PCIe Pin Name | PCIe Pin Description | M-PHY Usage (at "System Board") |
| 1 | +12V | 12 V power | Optional | PRSNT1# | Hot-Plug presence detect | Optional |
| 2 | +12V | 12 V power | | +12V | 12 V power | |
| 3 | +12V | 12 V power | | +12V | 12 V power | |
| 4 | GND | Ground | Ground | GND | Ground | Ground |
| 5 | SMCLK | SMBus clock | Optional | JTAG2 | TCK | Optional |
| 6 | SMDAT | SMBus data | | JTAG3 | TDI | |
| 7 | GND | Ground | Ground | JTAG4 | TDO | |
| 8 | +3.3V | 3.3 V power | Optional | JTAG5 | TMS | |
| 9 | JTAG1 | TRST# | | +3.3V | 3.3 V power | |
| 10 | 3.3Vaux | 3.3 V auxiliary power | | +3.3V | 3.3 V power | |
| 11 | WAKE# | Signal for Link reactivation | | PERST# | Fundamental reset | |
| | | | Mechanical key | | | |
| 12 | RSVD | Reserved | Reserved | GND | Ground | Ground |
| 13 | GND | Ground | Ground | REFCLK+ | Reference clock | Optional |
| 14 | PETp0 | Transmitter differential | TXDP, Lane 0 | REFCLK− | (differential pair) | |
| 15 | PETn0 | pair, Lane 0 | TXDN, Lane 0 | GND | Ground | Ground |
| 16 | GND | Ground | Ground | PERp0 | Receiver differential | RXDP, Lane 0 |
| 17 | PRSNT2# | Hot-Plug presence detect | Optional | PERn0 | pair, Lane 0 | RXDN, Lane 0 |
| 18 | GND | Ground | Ground | GND | Ground | Ground |
| | | | End of the x1 connector | | | |
| 19 | PETp1 | Transmitter differential | TXDP, Lane 1 | RSVD | Reserved | Reserved |
| 20 | PETn1 | pair, Lane 1 | TXDN, Lane 1 | GND | Ground | Ground |
| 21 | GND | Ground | Ground | PERp1 | Receiver differential | RXDP, Lane 1 |
| 22 | GND | Ground | Ground | PERn1 | pair, Lane 1 | RXDN, Lane 1 |
| 23 | PETp2 | Transmitter differential | TXDP, Lane 2 | GND | Ground | Ground |
| 24 | PETn2 | pair, Lane 2 | TXDN, Lane 2 | GND | Ground | Ground |
| 25 | GND | Ground | Ground | PERp2 | Receiver differential | RXDP, Lane 2 |
| 26 | GND | Ground | Ground | PERn2 | pair, Lane 2 | RXDN, Lane 2 |
| 27 | PETp3 | Transmitter differential | TXDP, Lane 3 | GND | Ground | Ground |
| 28 | PETn3 | pair, Lane 3 | TXDN, Lane 3 | GND | Ground | Ground |
| 29 | GND | Ground | Ground | PERp3 | Receiver differential | RXDP, Lane 3 |
| 30 | RSVD | Reserved | Reserved | PERn3 | pair, Lane 3 | RXDN, Lane 3 |
| 31 | PRSNT2# | Hot-Plug presence detect | Optional | GND | Ground | Ground |
| 32 | GND | Ground | Ground | RSVD | Reserved | Reserved |
| | | | End of the x4 connector | | | |
| 33 | PETp4 | Transmitter differential | TXDP, Lane 4 | RSVD | Reserved | Reserved |
| 34 | PETn4 | pair, Lane 4 | TXDN, Lane 4 | GND | Ground | Ground |
| 35 | GND | Ground | Ground | PERp4 | Receiver differential | RXDP, Lane 4 |
| 36 | GND | Ground | Ground | PERn4 | pair, Lane 4 | RXDN, Lane 4 |
| 37 | PETp5 | Transmitter differential | TXDP, Lane 5 | GND | Ground | Ground |
| 38 | PETn5 | pair, Lane 5 | TXDN, Lane 5 | GND | Ground | Ground |
| 39 | GND | Ground | Ground | PERp5 | Receiver differential | RXDP, Lane 5 |
| 40 | GND | Ground | Ground | PERn5 | pair, Lane 5 | RXDN, Lane 5 |
| 41 | PETp6 | Transmitter differential | TXDP, Lane 6 | GND | Ground | Ground |
| 42 | PETn6 | pair, Lane 6 | TXDN, Lane 6 | GND | Ground | Ground |
| 43 | GND | Ground | Ground | PERp6 | Receiver differential | RXDP, Lane 6 |
| 44 | GND | Ground | Ground | PERn6 | pair, Lane 6 | RXDN, Lane 6 |
| 45 | PETp7 | Transmitter differential | TXDP, Lane 7 | GND | Ground | Ground |
| 46 | PETn7 | pair, Lane 7 | TXDN, Lane 7 | GND | Ground | Ground |
| 47 | GND | Ground | Ground | PERp7 | Receiver differential | RXDP, Lane 7 |

TABLE 2-continued

Exemplary PCIe-M-PHY Mapping for Various Sized Connectors

| | Connector Side B - Upstream subsystem | | | Connector Side A - downstream subsystem | | |
|---|---|---|---|---|---|---|
| PCIe Pin Num | PCIe Pin Name | PCIe Pin Description | M-PHY Usage (at "System Board") | PCIe Pin Name | PCIe Pin Description | M-PHY Usage (at "System Board") |
| 48 | PRSNT2# | Hot-Plug presence detect | Optional | PERn7 | pair, Lane 7 | RXDN, Lane 7 |
| 49 | GND | Ground | Ground | GND | Ground | Ground |
| | | | End of the x8 connector | | | |
| 50 | PETp8 | Transmitter differential | TXDP, Lane 8 | RSVD | Reserved | Reserved |
| 51 | PETn8 | pair, Lane 8 | TXDN, Lane 8 | GND | Ground | Ground |
| 52 | GND | Ground | Ground | PERp8 | Receiver differential | RXDP, Lane 8 |
| 53 | GND | Ground | Ground | PERn8 | pair, Lane 8 | RXDN, Lane 8 |
| 54 | PETp9 | Transmitter differential | TXDP, Lane 9 | GND | Ground | Ground |
| 55 | PETn9 | pair, Lane 9 | TXDN, Lane 9 | GND | Ground | Ground |
| 56 | GND | Ground | Ground | PERp9 | Receiver differential | RXDP, Lane 9 |
| 57 | GND | Ground | Ground | PERn9 | pair, Lane 9 | RXDN, Lane 9 |
| 58 | PETp10 | Transmitter differential | TXDP, Lane 10 | GND | Ground | Ground |
| 59 | PETn10 | pair, Lane 10 | TXDN, Lane 10 | GND | Ground | Ground |
| 60 | GND | Ground | Ground | PERp10 | Receiver differential | RXDP, Lane 10 |
| 61 | GND | Ground | Ground | PERn10 | pair, Lane 10 | RXDN, Lane 10 |
| 62 | PETp11 | Transmitter differential | TXDP, Lane 11 | GND | Ground | Ground |
| 63 | PETn11 | pair, Lane 11 | TXDN, Lane 11 | GND | Ground | Ground |
| 64 | GND | Ground | Ground | PERp11 | Receiver differential | RXDP, Lane 11 |
| 65 | GND | Ground | Ground | PERn11 | pair, Lane 11 | RXDN, Lane 11 |
| 66 | PETp12 | Transmitter differential | TXDP, Lane 12 | GND | Ground | Ground |
| 67 | PETn12 | pair, Lane 12 | TXDN, Lane 12 | GND | Ground | Ground |
| 68 | GND | Ground | Ground | PERp12 | Receiver differential | RXDP, Lane 12 |
| 69 | GND | Ground | Ground | PERn12 | pair, Lane 12 | RXDN, Lane 12 |
| 70 | PETp13 | Transmitter differential | TXDP, Lane 13 | GND | Ground | Ground |
| 71 | PETn13 | pair, Lane 13 | TXDN, Lane 13 | GND | Ground | Ground |
| 72 | GND | Ground | Ground | PERp13 | Receiver differential | RXDP, Lane 13 |
| 73 | GND | Ground | Ground | PERn13 | pair, Lane 13 | RXDN, Lane 13 |
| 74 | PETp14 | Transmitter differential | TXDP, Lane 14 | GND | Ground | Ground |
| 75 | PETn14 | pair, Lane 14 | TXDN, Lane 14 | GND | Ground | Ground |
| 76 | GND | Ground | Ground | PERp14 | Receiver differential | RXDP, Lane 14 |
| 77 | GND | Ground | Ground | PERn14 | pair, Lane 14 | RXDN, Lane 14 |
| 78 | PETp15 | Transmitter differential | TXDP, Lane 15 | GND | Ground | Ground |
| 79 | PETn15 | pair, Lane 15 | TXDN, Lane 15 | GND | Ground | Ground |
| 80 | GND | Ground | Ground | PERp15 | Receiver differential | RXDP, Lane 15 |
| 81 | PRSNT2# | Hot-Plug presence detect | Optional | PERn15 | pair, Lane 15 | RXDN, Lane 15 |
| 82 | RSVD | Reserved | Reserved | GND | Ground | Ground |
| | | | End of the x16 connector | | | |

Common to the mapping of the various sized connectors is the repurposing of the PCIe, PETp, PETn, PERp, and PERn to the data lanes of the M-PHY protocol. While only the PCIe mapping has been shown, it should be understood that similar repurposing can be performed for other PCI standards.

FIG. 6 illustrates a schematic diagram of an exemplary direct coupling 90 using PCIe to connect two M-PHY devices. In particular, the upstream subsystem or system board 44 is coupled to the downstream subsystem or add-in card 46 through the mated connector 16. The M-PHY signals are shown passing over their respective PCIe pins (e.g., TXDP goes out from system board 44 over PETp pin, TXDN goes out over PETn pin, RXDP is received over the PERp pin and RXDN is received over the PERn pin). While only a single data lane is shown, it should be appreciated that with use of an x8 or x16 connector, more data lanes may be used with similarly repurposed pins.

FIG. 7 is a schematic diagram of an exemplary coupling 95 of two M-PHY devices 44, 46, but whereas in FIG. 6 there was a direct connection, in this example, they are connected by a PCIe cable 30. Again, the cable 30 couples using the mated connectors 16A, 16B described above with reference to FIG. 1B and the PETp, PETn, PERp, and PERn pins have been repurposed to carry the TXDP, TXDN, RXDP, and RXDN signals as previously explained. Note that while FIGS. 6 and 7 have omitted the capacitors 20, 28, they may be included if desired. It should be noted that PCIe PHYs are designed to support connectors and cables. M-PHY is optimized for short interconnect distances (e.g., <10 cm, but extendable up to 1 m with good quality interconnect). Using PCIe connectors and cables may increase differential insertion loss and reduce signal integrity. However, attention to cable length and quality ensures that the M-PHY signal requirements are met.

While the above discussion has focused primarily on PCIe 3.0, other PCI standards are explicitly contemplated. Use of these alternate standards such as PCIe mini card connector may depend on the space constraints of the devices which are being coupled or other considerations. TABLE 3 below provides a pin map for a PCIe mini card connector.

TABLE 3

Exemplary PCIe Mini Card Connector Pin Mapping to M-PHY

| PCIe Pin Num | PCIe Pin Name | PCIe Pin Description | M-PHY Usage (at "System Board") | PCIe Pin Num | PCIe Pin Name | PCIe Pin Description | M-PHY Usage (at "System Board") |
|---|---|---|---|---|---|---|---|
| End of the 76-pin connector ||||||||
| 75 | GND | Ground | Ground | 76 | MLDIR | DisplayPort data interface direction | Optional |
| 73 | ML0p | DisplayPort main link, pair 0 | Optional: TX or RX lane | 74 | GND | Ground | Ground |
| 71 | ML0n | | | 72 | GND | Ground | Ground |
| 69 | GND | Ground | Ground | 70 | ML1p | DisplayPort main link, pair 1 | Optional: TX or RX lane |
| 67 | GND | Ground | Ground | 68 | ML1n | | |
| 65 | ML2p | DisplayPort main link, pair 2 | Optional: TX or RX lane | 66 | GND | Ground | Ground |
| 63 | ML2n | | | 64 | GND | Ground | Ground |
| 61 | GND | Ground | Ground | 62 | ML3p | DisplayPort main link, pair 3 | Optional: TX or RX lane |
| 59 | GND | Ground | Ground | 60 | ML3n | | |
| 57 | AUXp | DisplayPort auxiliary channel | Optional: TX or RX lane | 58 | GND | Ground | Ground |
| 55 | AUXn | | | 56 | GND | Ground | Ground |
| 53 | DMC# | Display-Mini Card present | Optional | 54 | HPD | DisplayPort Hot Plug Detect | Optional |
| Mechanical Key/End of the 52-pin connector ||||||||
| 51 | W_DISABLE2# | Wireless Disable #2 | Optional | 52 | +3.3Vaux | 3.3 V aux power | Optional |
| 49 | Reserved | Reserved | Reserved | 50 | GND | Ground | Ground |
| 47 | Reserved | Reserved | | 48 | +1.5V | 1.5 V power | Optional |
| 45 | Reserved | Reserved | | 46 | LED_WPAN# | LED indicators | Optional |
| 43 | GND | Ground | Ground | 44 | LED_WLAN# | | |
| 41 | +3.3Vaux | 3.3 V aux power | Optional | 42 | LED_WWAN# | | |
| 39 | +3.3Vaux | 3.3 V aux power | | 40 | GND | Ground | Ground |
| 37 | GND | Ground | Ground | 38 | USB_D+ | USB2.0 differential pair | Optional |
| 35 | GND | Ground | Ground | 36 | USB_D− | | |
| 33 | PETp0 | Transmitter differential pair, Lane 0 | TXDP, Lane 0 | 34 | GND | Ground | Ground |
| 31 | PETn0 | | TXDN, Lane 0 | 32 | SMB_DATA | SMBus data | Optional |
| 29 | GND | Ground | Ground | 30 | SMB_CLK | SMBus clock | |
| 27 | GND | Ground | Ground | 28 | +1.5V | 1.5 V power | |
| 25 | PERp0 | Receiver differential pair, Lane 0 | RXDP, Lane 0 | 26 | GND | Ground | Ground |
| 23 | PERn0 | | RXDN, Lane 0 | 24 | +3.3Vaux | 3.3 V aux power | Optional |
| 21 | GND | Ground | Ground | 22 | PERST# | Functional reset | |
| 19 | UIM_IC_DP | Inter-chip USB data lines | Optional | 20 | W_DISABLE1# | Wireless Disable #1 | |
| 17 | UIM_IC_DM | | | 18 | GND | Ground | Ground |
| Mechanical Key ||||||||
| 15 | GND | Ground | Ground | 16 | UIM_SPU | UIM SPU | Optional |
| 13 | REFCLK+ | Reference clock | Optional | 14 | UIM_RESET | UIM reset | |
| 11 | REFCLK− | | | 12 | UIM_CLK | UIM clock | |
| 9 | GND | Ground | Ground | 10 | UIM_DATA | UIM data | |
| 7 | CLKREQ# | Reference clock request | Optional | 8 | UIM_PWR | UIM power | |
| 5 | COEX2 | Wireless coexistence #2 | | 6 | 1.5V | 1.5 V power | Optional |
| 3 | COEX1 | Wireless coexistence #2 | | 4 | GND | Ground | Ground |
| 1 | WAKE# | Signal for Link reactivation | | 2 | 3.3Vaux | 3.3 V aux power | Optional |

The repurposing of the mini card connector allows M-PHY Type I or Type II to be used. If the mini card has 52 pins, then a single TX and RX lane are possible. If the mini card has 76 pins, and display port features are not used, up to five additional TX or RX lanes can be supported as noted by the "optional: TX or RX lane" designation in TABLE 3. 1.5V power is available at pins 6, 28, and 48. Likewise, 3.3 V auxiliary power is available at pins 2, 24, 39, 41, and 52. If insertion detection is needed at the system board, the provision of power of at least one voltage level may be used to detect insertion. If insertion detection is needed on the add-in card, then a pin marked as optional, which is otherwise unused (e.g., pin 54 in a 76 pin connector) may be connected to a pin with a known potential (e.g., one of GND or 1.5V power or 3.3V power). In practice, on mating, the system board detects that the specific pin is chosen and set to a known potential. This indicates that the add-in card has been connected. The add-in card merely detects if it is receiving power via the power pins to detect insertion. Pins 11 and 13 support a shared clock if desired.

Instead of a PCIe mini card connector, a PCI express external cabling arrangement may also be used. The mapping of an x1 connector for such arrangement is presented in TABLE 4 below.

TABLE 4

Exemplary PCI Express External Cabling-M-PHY Mapping

| PCIe Pin Num | PCIe Signal | PCIe Signal Description | M-PHY Usage |
|---|---|---|---|
| A1 | PERn0 | Receiver differential pair | RXDP |
| A2 | PERp0 | | RXDN |
| A3 | RSVD | Reserved (no wire) | Reserved |
| A4 | SB_RTN | Signal return for sideband signals | Optional |
| A5 | CREFCLKn | Reference clock | |
| A6 | CREFCLKp | | |
| A7 | PWR_RTN | Return for +3.3 V power (no wire) | |
| A8 | CPERST# | Cable platform reset | |
| A9 | GND | Ground reference, transmitter lane | Ground reference, transmitter lane |
| B1 | GND | Ground reference, receiver lane | Ground reference, receiver lane |
| B2 | RSVD | Reserved (no wire) | Optional |
| B3 | CWAKE# | Power management wake signal | |
| B4 | CPRSNT# | Detect cable and downstream system | |
| B5 | GND | Ground reference, reference clock | Ground reference, reference clock |
| B6 | PWR | +3.3 V power (no wire) | Optional |
| B7 | CPWRON | Notify upstream system power valid | |
| B8 | PETn0 | Transmitter differential pair | TXDP |
| B9 | PETp0 | | TXDN |

Note that signals described as 'no wire' in TABLE 4 above have no conductor inside the cable 30, meaning that they do not actually go across the cable 30. This mapping arrangement supports M-PHY Type I and Type II with a single TX lane and a single RX lane. Unlike the previous examples, this arrangement is not designed for power delivery. If insertion detection is needed, the optional pins listed in TABLE 4 above may be used. For example, the signal CPRSNT# at pin B4 may be used to detect the downstream. A shared clock can be made available, supporting M-PHY Type II. The shared clock could be provided using one or both of pins A5 and A6. As alluded to above, this can be extended to x4, x8, and x16 connectors and cables.

Another exemplary reuse of a PCI style connector includes the use of an ExpressCard connector form factor. The ExpressCard module is a small, modular add-in card based on PCIe and USB technologies. Two standard module form factors are defined: ExpressCard/34 and ExpressCard/54, both using the same I/O schemes. The mapping of the pins is set forth below in TABLE 5.

TABLE 5

Exemplary ExpressCard-M-PHY Mapping

| ExpressCard Pin Num | ExpressCard Signal | ExpressCard Signal Description | M-PHY Usage |
|---|---|---|---|
| 26 | GND | Ground | Ground |
| 25 | PETp0/SSTX+ | Transmitter differential pair | TXDP |
| 24 | PETn0/SSTX− | | TXDN |
| 23 | GND | Ground | Ground |
| 22 | PERp0/SSRX+ | Receiver differential pair | RXDP |
| 21 | PERn0/SSRX− | | RXDN |
| 20 | GND | Ground | Ground |
| 19 | CREFCLKn | Reference clock | Optional |
| 18 | CREFCLKp | | |
| 17 | CPPE# | PCIe module detection | Optional |
| 16 | CLKREQ# | PCIe clock request | |
| 15 | +3.3 V | +3.3 power | |
| 14 | +3.3 V | +3.3 power | |
| 13 | PERST# | PCIe functional reset | |
| 12 | +3.3VAUX | +3.3 auxiliary power | |
| 11 | WAKE# | PCIe wake signal | |
| 10 | +1.5 V | +1.5 power | |
| 9 | +1.5 V | +1.5 power | |
| 8 | SMBDATA | SMB data | |

TABLE 5-continued

Exemplary ExpressCard-M-PHY Mapping

| ExpressCard Pin Num | ExpressCard Signal | ExpressCard Signal Description | M-PHY Usage |
|---|---|---|---|
| 7 | SMBCLK | SMB clock | |
| 6 | RESERVED | Reserved | Unconnected |
| 5 | USB3# | USB3.0 interface detection | Optional |
| 4 | CPUSB# | USB module detection | |
| 3 | USBD+ | USB2.0 data interface | |
| 2 | USBD− | | |
| 1 | GND | Ground | Ground |

The arrangement set forth in TABLE 5 supports M-PHY Type I and Type II with a single TX lane and a single RX lane. Power may be supplied at 1.5V power using pins 9 and 10. Power may be supplied at 3.3V power using pins 14 and 15, and power may be supplied at 3.3V auxiliary power using pin 12. If insertion detection is desired, a pin marked as optional may be repurposed to provide a known voltage signal detected as described above. A shared clock can be supplied for M-PHY Type II using one or both of pins 18 and 19.

While the present disclosure has focused on repurposing particular pins from the PCI standard to M-PHY usage, it should be noted that any pins on the PCI-based connector can be repurposed to carry the transmitter and receiver differential pair. As a matter of design choice, it makes more sense to repurpose the transmitter and receiver differential pairs from the PCI-based connector to act as transmitter and receiver differential pairs under the M-PHY usage. Likewise, in many instances it makes sense to preserve the purpose of the PCI-based pins in the M-PHY usage. For example, it makes sense to preserve a ground connection as a ground connection. Likewise, pins that are designated as power pins under the PCI-based system may be preserved as power pins in the M-PHY system. Such preservation of pin functionality promotes interoperability and allows designers familiar with one system to adapt readily to pin layouts in the repurposed system.

It should be appreciated that the organization (PCI-SIG) that promulgates the PCI standard provides updates to the standard as technology evolves. For example, while not finalized, there are current plans codenamed PCI-NGFF (PCI- Next Generation Form Factor) for the next generation of form factor to be used for Mobile Add-In cards. PCI-NGFF is described as a natural transition from the Mini Card and the Half Mini Card to a smaller form factor in both size and volume. However, this next generation connector still defines many of the same data paths and pin layouts. The present disclosure is also applicable to such prospective PCI-based form factors. Accordingly, as used herein "PCI-based" includes all current and future form factors defined by PCI-SIG for the family of standards based on the peripheral component interconnect concept.

The operation of the M-PHY communications protocol over a PCI interface and related devices, systems, and methods, according to embodiments disclosed herein, may be provided in or integrated into any processor-based device. Examples, without limitation, include a set top box, an entertainment unit, a navigation device, a communications device, a fixed location data unit, a mobile location data unit, a mobile phone, a cellular phone or smart phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 8:
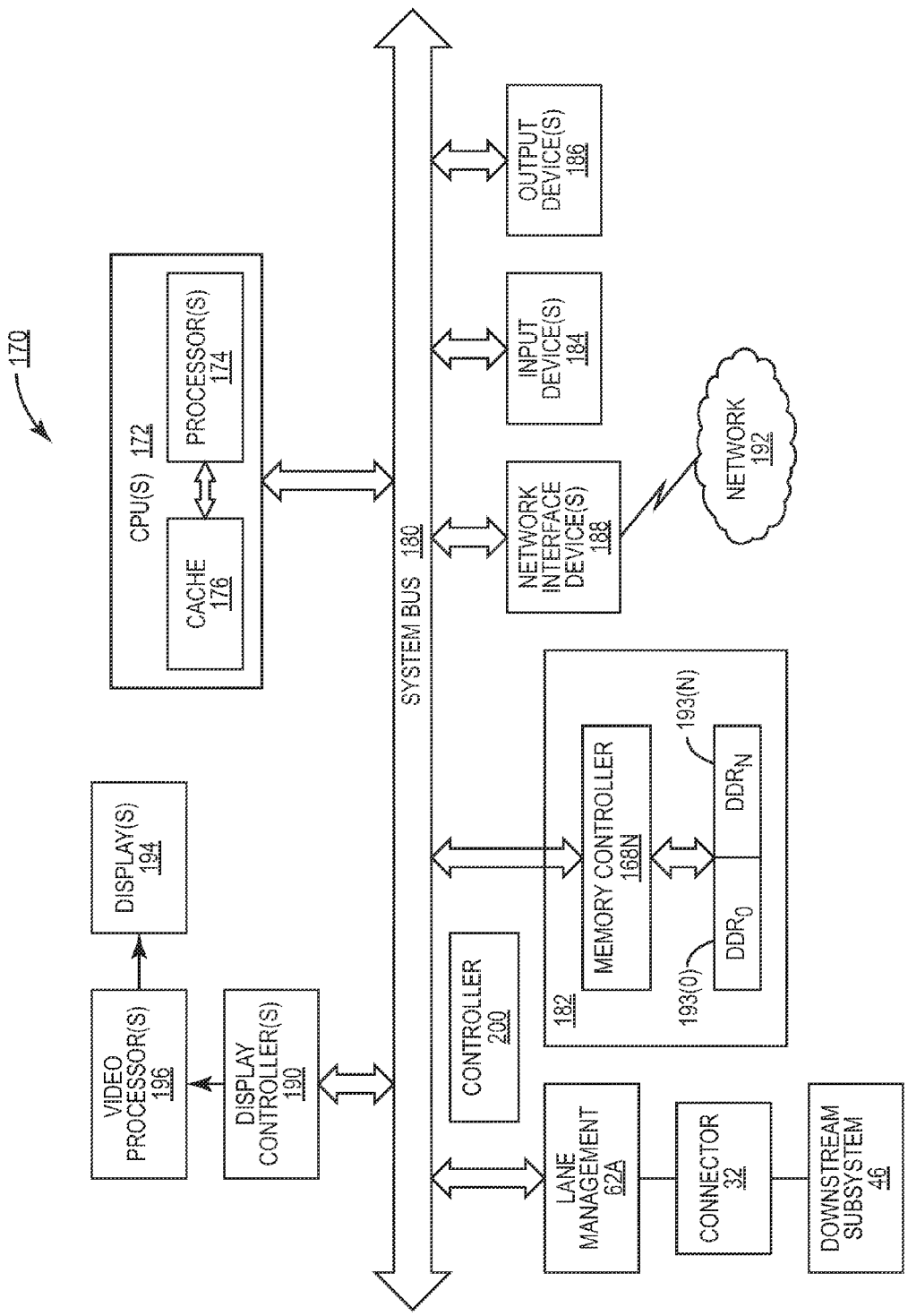
FIG. 8 is a block diagram of exemplary processor-based electronic devices and systems, any of which can include a PCI connector having PCI pins mapped to M-PHY standard data paths according to the embodiments disclosed herein.

In this regard, FIG. 8 illustrates an example of a processor-based system 170 that can employ the connector socket 32 illustrated in FIG. 1C (or other PCI compliant plug or receptacle), with the mapping of FIG. 2 (in any of the configurations set forth above or other comparable configurations tailored to a different plug or receptacle) applied thereto. A controller 200 interoperates with the lane management module 62A as illustrated. In this example, the processor-based system 170 includes one or more central processing units (CPUs) 172, each including one or more processors 174. The CPU(s) 172 may be a master device. The CPU(s) 172 may have cache memory 176 coupled to the processor(s) 174 for rapid access to temporarily stored data. The CPU(s) 172 is coupled to a system bus 180 and can intercouple master devices and slave devices included in the processor-based system 170. The system bus 180 may be a bus interconnect. As is well known, the CPU(s) 172 communicates with these other devices by exchanging address, control, and data information over the system bus 180. For example, the CPU(s) 172 can communicate bus transaction requests to the memory controller 168(N) as an example of a slave device. Although not illustrated in FIG. 8, multiple system buses 180 could be provided, wherein each system bus 180 constitutes a different fabric.

Other master and slave devices can be connected to the system bus 180. As illustrated in FIG. 8, these devices can include a memory system 182, one or more input devices 184, one or more output devices 186, one or more network interface devices 188, and one or more display controllers 190, as examples. The input device(s) 184 can include any type of input device, including but not limited to input keys, switches, voice processors, etc. The output device(s) 186 can include any type of output device, including but not limited to audio, video, other visual indicators, etc. The network interface device(s) 188 can be any devices configured to allow exchange of data to and from a network 192. The network 192 can be any type of network, including but not limited to a wired or wireless network, private or public network, a local area network (LAN), a wide local area network (WLAN), and the Internet. The network interface device(s) 188 can be configured to support any type of communication protocol desired. The memory system 182 can include one or more memory units 193(0-N). The arbiter may be provided between the system bus 180 and master and slave devices coupled to the system bus 180, such as, for example, the memory units 193(0-N) provided in the memory system 182.

The CPU(s) 172 may also be configured to access the display controller(s) 190 over the system bus 180 to control information sent to one or more displays 194. The display controller(s) 190 sends information to the display(s) 194 to be displayed via one or more video processors 196, which process the information to be displayed into a format suitable for the display(s) 194. The display(s) 194 can include any type of display, including but not limited to a cathode ray tube (CRT), a liquid crystal display (LCD), a plasma display, etc.

The CPU(s) 172 and the display controller(s) 190 may act as master devices to make memory access requests to an arbiter over the system bus 180. Different threads within the CPU(s) 172 and the display controller(s) 190 may make requests to the arbiter.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The arbiters, master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a DSP, an Application Specific Integrated Circuit (ASIC), an FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An electronic device configured to operate using a M-PHY standard, comprising:
   a communications interface having a plurality of data paths conforming to the M-PHY standard; and
   a PCI-based connector having a plurality of pins, comprising:
      a PETp pin electrically coupled to a M-PHY TXDP data path of the communications interface;
      a PETn pin electrically coupled to a M-PHY TXDN data path of the communications interface;
      a PERp pin electrically coupled to a M-PHY RXDP data path of the communications interface; and
      a PERn pin electrically coupled to a M-PHY RXDN data path of the communications interface.

2. The device of claim 1, wherein other pins of the plurality of pins are configured to allow insertion detection.

3. The device of claim 1, wherein other pins of the plurality of pins are configured to provide power therethrough.

4. The device of claim 1, wherein other pins of the plurality of pins are configured to provide an additional data channel therethrough.

5. The device of claim 1, wherein the PCI-based connector conforms to a PCIe 3.0 standard.

6. The device of claim 1, wherein the PCI-based connector comprises an element selected from the group consisting of: a plug, a socket, and a plug with a cable.

7. The device of claim 1 integrated into a semiconductor die.

8. The device of claim 1, further comprising a device selected from the group consisting of: a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player, into which the electronic device is integrated.

9. An electronic device configured to operate using a M-PHY standard, comprising:
   means for interfacing the electronic device to another device, the interfacing means having a plurality of data paths conforming to the M-PHY standard; and
   a PCI-based connecting means for connecting the interfacing means to another device, the PCI-based connecting means having a plurality of pins comprising:
      a PETp pin electrically coupled to a M-PHY TXDP data path of the means for interfacing;
      a PETn pin electrically coupled to a M-PHY TXDN data path of the means for interfacing;
      a PERp pin electrically coupled to a M-PHY RXDP data path of the means for interfacing; and
      a PERn pin electrically coupled to a M-PHY RXDN data path of the means for interfacing.

10. The device of claim 9, wherein the interfacing means comprises a communications interface.

11. The device of claim 9, wherein the PCI connecting means comprises a PCI-based connector.

12. The device of claim 9, wherein the PCI connecting means comprises a PCIe connector.

13. A method of connecting an electronic device configured to operate using a M-PHY standard to a second device, comprising:
   providing a plurality of data paths conforming to the M-PHY standard;
   providing a PCI-based connector having a plurality of pins;
   electrically coupling a PETp pin to a M-PHY TXDP data path;
   electrically coupling a PETn pin to a M-PHY TXDN data path;
   electrically coupling a PERp pin to a M-PHY RXDP data path; and
   electrically coupling a PERn pin to a M-PHY RXDN data path.

14. The method of claim 13, wherein providing the PCI-based connector comprises providing a PCI connector conforming to a PCIe 3.0 protocol.

15. The method of claim 13, wherein providing a PCI-based connector comprises providing at least one of a plug, a socket, and a plug with a cable.

16. The method of claim 13, wherein providing the PCI-based connector comprises providing a PCI-based connector conforming to the PCI Express Mini Card connector protocol.

17. The method of claim 13, wherein providing the PCI-based connector comprises providing a PCI-based connector conforming to the PCI express external cabling protocol.

18. An electronic device configured to operate using a M-PHY standard, comprising:
   a communications interface having a plurality of data paths conforming to the M-PHY standard; and
   a PCI-based connector having at least four pins, comprising:
      a first two pins configured to couple electrically to a M-PHY transmission data path of the communications interface; and
      a second two pins configured to couple electrically to a M-PHY receive data path of the communications interface.

19. The electronic device of claim 18, wherein the PCI-based connector preserves ground connections from the PCI format to the M-PHY format.

\* \* \* \* \*